United States Patent [19]

Junker

[11] 4,088,329
[45] May 9, 1978

[54] CONTROLLED APERTURE SEAL WITH DRAG PAD

[75] Inventor: Arnold E. Junker, Bridgeport, Conn.

[73] Assignee: Avco Corporation, Stratford, Conn.

[21] Appl. No.: 724,139

[22] Filed: Sep. 17, 1976

[51] Int. Cl.² .............................................. F16J 15/30
[52] U.S. Cl. ........................................ 277/26; 277/216
[58] Field of Search .................... 277/136, 7, 26, 216, 277/223, 54, 217

[56] References Cited

U.S. PATENT DOCUMENTS

| 3,190,661 | 6/1965 | Wahl et al. | 277/136 |
| 3,964,753 | 6/1976 | Junker et al. | 277/216 |

Primary Examiner—Robert I. Smith
Attorney, Agent, or Firm—Charles M. Hogan; Irwin P. Garfinkle; Ralph D. Gelling

[57] ABSTRACT

A carbon ring seal for a shaft rotating at high speed is capable of preventing high temperature, high pressure gas from entering the oil system. The carbon seal is constructed so that at ambient temperature it works as a controlled gap seal, but when the seal runner reaches its full thermal growth the seal then functions as a positive contact seal. The carbon seal ring is not pinned against rotation, but rotation is limited by means of an integral drag pad. The seal housing is provided with a plurality of calibrated holes for predetermined internal pressurization and cooling.

6 Claims, 3 Drawing Figures

CONTROLLED APERTURE SEAL WITH DRAG PAD

BACKGROUND AND SUMMARY OF THE INVENTION

The disclosed seal is used in a high performance gas turbine engine as a shaft seal for a shaft rotating at 465 feet per second for the purpose of preventing gases at high temperature (1200° F.) and pressure (45 psia) from entering the engine oil system. Under these conditions prior art seals, capable of preventing oil of air leakage, had very short lives.

My prior co-invention, U.S. Pat. No. 3,964,753, issued June 22, 1976, was an improvement over the prior art in that it utilized a carbon ring which under normal operating conditions was subject to very little wear. The carbon seal ring was fabricated with a single crack and so that its inner diameter is initially larger than the cool seal runner size, but slightly smaller than the hot runner size. Therefore, the carbon seal ring initially presented a gap through which controlled air leakage occurred. However, when the shaft diameter grew due to temperature and centrifugal forces during initial operation, the carbon seal ring was worn by runner friction until its final size was equal to the hot seal runner diameter. Thus, after initial operation the carbon seal ring was perfectly conformed to the seal runner and has essentially no gap, only an oil bearing film was provided between the carbon seal ring and the shaft. The carbon ring was fractured at one location to permit ring expansion sufficient to accommodate initial thermal growth of the shaft. The carbon ring was pinned to the housing through a single radial slot for anti-rotation of the carbon ring and to accommodate shaft eccentricity or run out.

The present invention is an improvement over U.S. Pat. No. 3,964,753 in that I eliminate the anti-rotation pin, and instead I permit a limited rotation, the amount of which is controlled by means of drag pad integral with the ring. The drag pad consits of a radial enlargement of the seal face along the periphery of a small arc of the ring. The drag pad provides increased friction especially at one end of the ring and hence limits the speed of rotation of the ring, and provides an unwinding action to the carbon ring.

THE DRAWINGS

DESCRIPTION OF THE INVENTION

Figure 1:
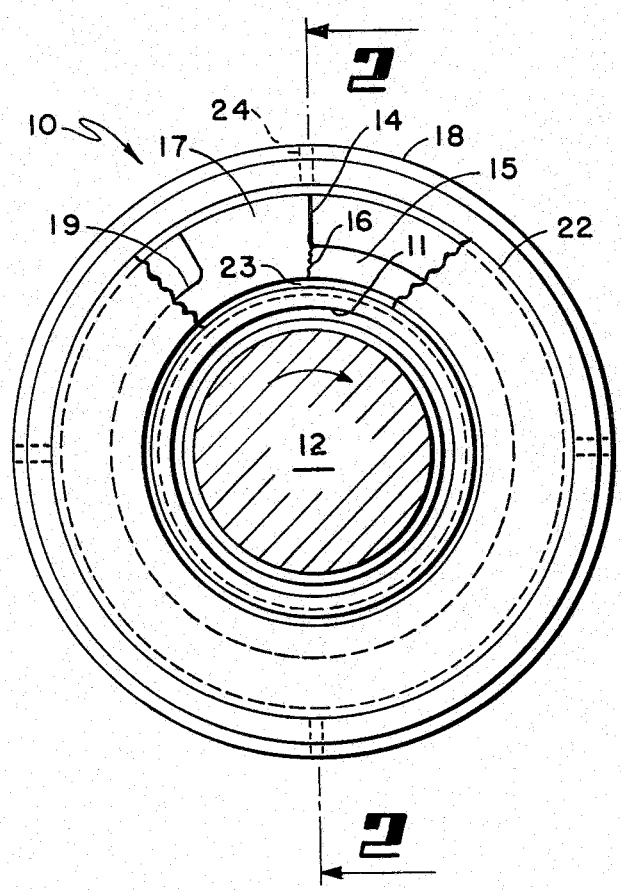
FIG. 1 is an end view showing an exemplary embodiment of the invention.
Figure 2:
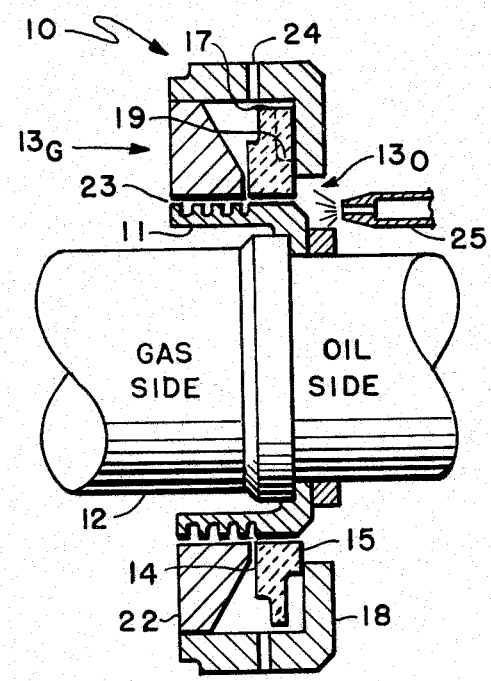
FIG. 2 is a cross-section, taken through the line 2—2 in FIG. 1.

Referring to FIGS. 1 and 2, a seal 10 is shown mounted on the seal runner 11 of a rotating shaft 12. The purpose of the seal is to prevent the leakage of gases into the oil system from area $13_O$ and prevent oil leakage from area $13_G$.

In the anticipated environment $13_O$ for which this seal was designed, the gas has an operating temperature of 1200° F., and an operating pressure of 45 psia. Moreover, the shaft 12 rotates at a speed of 465 feet per second with respect to the seal 10. The maximum allowable air leakage into the bearing package is 2500 standard cubic inch/minute which occurs during a cold start. It will be understood, of course, that the seal will operate at higher and lower speeds and at higher and lower pressures but that its advantage is mainly demonstrated under high-performance operating conditions.

Figure 3:
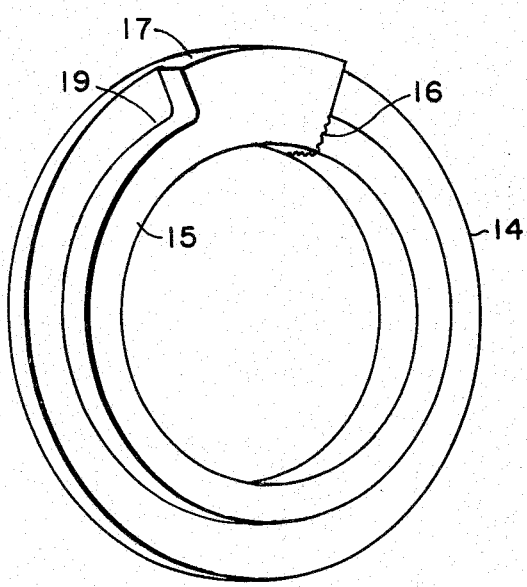
FIG. 3 is a perspective view showing the carbon ring.

The sealing element is a carbon ring 14 which is initially provided with an oversized inner diameter, i.e., it is initially slightly larger than the O.D. of the seal runner 11 in cold and stationary condition, but slightly smaller than seal runner 11 at operating temperatures and speeds. The carbon ring 14 has a face 15 and an integral circumferential pad 17. The pad 17 is formed in the ring 14 by means of a circumferential groove 19 extending over a large segment of the ring periphery. The pad 17 serves to oppose rotation of the ring 14 and provides unwinding action to the carbon ring in a counterclockwise direction as viewed from the oil side in FIG. 3. The ring 14 is provided with a radial fracture 16 located at the pad 17. The fracture 16 has two different functions: first, to accommodate initial thermal growth, and second, the fracture by itself achieves extremely good radial and axial sealing after the ring is conformed to the runner by wearing in. This wearing in is achieved during normal engine acceptance testing. The carbon ring 14 is retained within the housing 18 by means of a retainer ring 22 which together with the seal runner 11 provides a conventional labyrinth seal 23.

The housing 18 is provided with a plurality of gas ports 24 calibrated for predetermined internal pressurization and cooling and to provide an axial, aerodynamic pressure load on carbon ring 14 against housing 18 to avoid radial leakage.

The particular inner dimensions of the controlled aperture carbon ring are determined by calculation and testing. The carbon ring 14 inner diameter is designed so that it is initially oversized or larger than the cool runner size, but smaller than the runner at operating temperature. As the shaft grows, the runner 11 contacts and expands the carbon ring. The final size of the carbon ring aperture at hot shaft conditions is determined by the wear initially resulting from shaft thermal and centrifugal growth, so that after initial shaft operation, the carbon ring is perfectly conformed and has essentially no gap between it and the shaft. The small gap which does exist is filled with an oil bearing film; oil is provided for cooling and lubrication by an oil jet 25. In other words, the resulting aperture of the carbon ring is self-adjusting during initial engine operation as a result of shaft terminal and centrifugal growth so that after the carbon ring conforms to the runner there is essentially no additional wear during normal operation because radial loading on the carbon ring from surrounding gas pressure does not have any clamping action on the runner, since the seated ends of the carbon ring, at the fracture, act as a solid ring.

The fracture at 16 is provided to accommodate any shaft growth, but does not permit any radial or axial leakage at full operating temperature once the ring has worn to shaft size.

The unwinding of the carbon sealing ring minimizes wear if contact does occur, since a wedge-shaped gap results and permits a hydrodynamic flow of lubricant to restore the oil bearing film. When the shaft is at operating temperature there is essentially no air leakage into the bearing package.

The major difference between this seal and the seal disclosed in my prior co-invention, U.S. Pat. No. 3,964,753 is the carbon ring design itself; it still has a fracture but does not have any anti-rotation device. The seal in U.S. Pat. No. 3,964,753 utilizes a pin for anti-rotation. In this new seal design I use the increase of friction of the pad 17 against seal case 18 for the same purpose. The carbon ring is completely free to rotate; however the pressure acting on the face 15 and the pad 17 against the interior face of the seal case 18 increases friction at one end of the ring. The O.D. of the carbon has been designed to run close to the I.D. of the seal case; the clearance or gap between the carbon and the seal case is designed to avoid any overstressing in case of carbon rotation overspeed.

The required axial clamping force versus rotational drag is determined by calculation and experimentation. The axial force is maintained slightly higher than the rotational drag (radial force) to minimize the rotational speed of the carbon. This axial force acts at the face 15 and on the drag pad 17 next to the fracture and retards rotation of the carbon.

The air which enters through the openings 24 is at a higher pressure than the ambient pressure at the entrance to labyrinth seal 11. This insures a positive flow through the labyrinth seal to the left as viewed in FIG. 1 and prevents the entrance of sand and dust or other particulate contaminants. This naturally implies selection of a bleed point for the air supply to openings 24 from a clean source of air.

Among the advantages of this new design are: (1) very simple design; (2) very small seal envelope; (3) more life expectancy due to self-cleaning of mating surfaces; (4) lower cost; (5) the carbon ring will not be subject to impact as in the current pin design during lubrication starved, or dry contact; (6) able to run at higher pressure, carbon O.D. can be smaller; (7) almost complete enclosure of carbon ring keeps pieces from escaping into the bearing cavity in case of multiple fractures of carbon ring; (8) gravity scavenge is all that is needed to return the oil to the sump. A separate scavenge pump is not needed and will unbalance the system.

It will be apparent to persons skilled in the art that the foregoing embodiments are subject to many modifications and adaptations. For example, while we show a separate seal runner 11 mounted on a shaft 12, it will be understood that the invention can work equally well where the seal runner is integral with the shaft. It is also understood depending on the specific engine configuration and seal environmental location that optimum seal performance may be achieved without internal pressurization.

I claim:

1. A sealing assembly for use on a high-speed shaft comprising:
    a seal runner on the shaft;
    a housing having an interior chamber surrounding the shaft;
    a sealing ring mounted for free rotation on the seal runner within the housing chamber, said sealing ring having an inner diameter greater than the outer diameter of the runner when the shaft is cold and essentially equal to the diameter of the runner during normal operating conditions;
    said ring having a radially extending side face constructed to frictionally engage the housing along a limited portion of its area to create an unbalanced force on the ring which tends to retard rotation of the ring and cause an unwinding action within the ring;
    said ring being radially fractured adjacent the limited engaging portion of the side face; and
    means retaining the sealing ring within the housing.

2. A sealing assembly for use on a high-speed shaft as described in claim 4 wherein the radially extending side face is formed by a cylindrical step having an outer diameter which is less than the outer diameter of the sealing ring; said step being interrupted for a limited section of its circumference by a pad extending radially outward from the step to the outer diameter of the ring; thereby creating a limited area of increased frictional engagement with the housing.

3. The invention as defined in claim 1 wherein said seal ring is carbon and is inherently circumferentially resilient.

4. The invention as defined in claim 3 wherein said housing is provided with a plurality of circumferentially spaced ports for admitting gas under pressure to said housing, said ports being sized for providing predetermined internal pressurization for optimum seal performance, cooling and to provide an axial, aerodynamic pressure load on side face and the pad against the housing to minimize the rotational speed of the sealing ring and avoid radial leakage.

5. The invention as defined in claim 4 and means for supplying a film of oil between said ring and said runner.

6. The invention as defined in claim 1 wherein said retaining means and said runner form a labyrinth seal.

* * * * *

UNITED STATES PATENT AND TRADEMARK OFFICE
CERTIFICATE OF CORRECTION

PATENT NO. : 4,088,329
DATED : May 9, 1978
INVENTOR(S) : Arnold E. Junker

It is certified that error appears in the above-identified patent and that said Letters Patent are hereby corrected as shown below:

Column 1, line 41, cancel "consits" and insert therefor --consists--.

Column 2, line 47, cancel "terminal" and insert therefore --thermal--.

Column 4, line 23, cancel "4" and insert therefore --1--.

Column 4, line 43, cancel "4" and insert therefore --1--.

Signed and Sealed this

Twenty-third Day of January 1979

[SEAL]

Attest:

RUTH C. MASON
Attesting Officer

DONALD W. BANNER
Commissioner of Patents and Trademarks